(12) United States Patent
Miyata et al.

(10) Patent No.: US 9,901,181 B2
(45) Date of Patent: Feb. 27, 2018

(54) SEAT WITH VENTILATIVE PROPERTY

(71) Applicant: TACHI-S CO., LTD., Tokyo (JP)

(72) Inventors: Kei Miyata, Tokyo (JP); Junpei Yoshikawa, Tokyo (JP)

(73) Assignee: TACHI-S CO., LTD., Tokyo (JP)

( * ) Notice: Subject to any disclaimer, the term of this patent is extended or adjusted under 35 U.S.C. 154(b) by 75 days.

(21) Appl. No.: 15/021,160

(22) PCT Filed: Sep. 10, 2014

(86) PCT No.: PCT/JP2014/073942
§ 371 (c)(1),
(2) Date: Mar. 10, 2016

(87) PCT Pub. No.: WO2015/045874
PCT Pub. Date: Apr. 2, 2015

(65) Prior Publication Data
US 2016/0220028 A1 Aug. 4, 2016

(30) Foreign Application Priority Data
Sep. 26, 2013 (JP) .................................. 2013-199105

(51) Int. Cl.
*B60N 2/56* (2006.01)
*A47C 7/74* (2006.01)
(Continued)

(52) U.S. Cl.
CPC ................ *A47C 7/746* (2013.01); *A47C 7/18* (2013.01); *A47C 7/35* (2013.01); *A47C 7/40* (2013.01);
(Continued)

(58) Field of Classification Search
CPC .... B60N 2/5642; B60N 2/5657; B60N 2/565; B60N 2/7082; B60N 2/7088; B60N 2/5664
See application file for complete search history.

(56) References Cited

U.S. PATENT DOCUMENTS 6,003,950 A * 12/1999 Larsson ................... A47C 7/74
297/180.13
8,864,238 B2 * 10/2014 Oota ....................... B29C 33/10
297/452.42
(Continued)

FOREIGN PATENT DOCUMENTS

CN 2161183 Y 4/1994
CN 2663207 Y 12/2004
(Continued)

*Primary Examiner* — Timothy J Brindley
(74) *Attorney, Agent, or Firm* — Birch, Stewart, Kolasch & Birch, LLP (57) ABSTRACT

To provide a seat with ventilative property, which can eliminate or minimize the possibility of its being permanently deformed and settled into an unrecoverable deformed state. In the seat with ventilative property, left and right three-dimensional network cushion elements are provided in a forwardly-facing region of a seat cushion of the seat, in a manner independent of each other, such that the left and right three-dimensional network cushion elements are respectively situated at: one location on which a left thigh portion of a seat occupant is to be contacted; and the other location on which a right thigh portion of the seat occupant is to be contacted. This arrangement can almost completely prevent a direct application of a weight of the seat occupant to the two three-dimensional network cushion elements. Therefore, the present invention has the effect that a permanent downward settling of the seat cushion SC can be prevented, so that a short life of the seat due to such permanent settling may be substantially avoided.

3 Claims, 4 Drawing Sheets

(51) Int. Cl.
*A47C 27/22* (2006.01)
*A47C 7/18* (2006.01)
*A47C 7/40* (2006.01)
*B68G 11/04* (2006.01)
*B60N 2/70* (2006.01)
*A47C 7/35* (2006.01)

(52) U.S. Cl.
CPC ............ *A47C 27/22* (2013.01); *B60N 2/5664* (2013.01); *B60N 2/7017* (2013.01); *B68G 11/04* (2013.01)

(56) References Cited

U.S. PATENT DOCUMENTS

| | | | | |
|---|---|---|---|---|
| 2005/0200166 | A1* | 9/2005 | Noh | B60N 2/5642 297/180.14 |
| 2015/0158213 | A1* | 6/2015 | Mogi | B29C 39/10 264/46.9 |
| 2015/0158214 | A1* | 6/2015 | Mogi | B29C 44/1276 264/46.4 |
| 2015/0158405 | A1* | 6/2015 | Miyata | A47C 27/14 297/180.1 |
| 2015/0274048 | A1* | 10/2015 | Mogi | B60N 2/5642 297/452.48 |
| 2017/0021750 | A1* | 1/2017 | Kumagai | A47C 27/14 |
| 2017/0043695 | A1* | 2/2017 | Kitamoto | A47C 27/00 |
| 2017/0100860 | A1* | 4/2017 | Kumagai | A47C 27/14 |
| 2017/0136926 | A1* | 5/2017 | Dry | B60N 2/5642 |

FOREIGN PATENT DOCUMENTS

| | | | |
|---|---|---|---|
| CN | 201052752 Y | 4/2008 | |
| JP | 58-121253 U | 8/1983 | |
| JP | 62-14930 Y2 | 4/1987 | |
| JP | 2004073429 A * | 3/2004 | ............... A47C 7/18 |
| JP | 2012-115515 A | 6/2012 | |
| JP | 2013-23140 A | 2/2013 | |

\* cited by examiner

SEAT WITH VENTILATIVE PROPERTY

TECHNICAL FIELD

The present invention relates to a seat with ventilative property, which is capable of ventilation to avoid a seat occupant becoming sweaty at points where his or her body portion contacts the seat.

BACKGROUND ART

Conventionally, in this kind of technical field, for example, a Japanese Laid-Open Patent Publication No. 2012-115515 discloses a seat having a ventilative property, which comprises: an urethane foam padding provided in a seating area of a seat cushion of the seat at a point where a buttocks portion of a seat occupant is to be positioned; and a three-dimensional network cushion element disposed in the seat cushion at another point where two thigh portions of the seat occupant are to be positioned, wherein the three-dimensional network cushion element is formed by entangling fibers with one another in a three-dimensional network fashion. In this prior art, the three-dimensional network cushion element acts to ventilate the seat cushion at the point corresponding to the seat occupant's thigh portions, thereby reducing humidity there to minimize the possibility of the seat occupant's getting sweaty at his or her thigh portions.

PRIOR-ART LITERATURE

Patent-Related Document

Patent-related Document 1:
Japanese Laid-Open Patent Publication No. 2012-115515

SUMMARY OF THE INVENTION

Problems to be Solved by the Present Invention

According to the above-described conventional ventilative seat, the three-dimensional network cushion element is so disposed as to occupy a substantive forward region of the seat cushion, which is indeed effective for greatly reducing humidity there to avoid a sweaty state of the seat occupant's thigh portions. However, since the three-dimensional network cushion element actually occupies substantive forward region of the seat cushion, it has been found that, during a long period of time in using the seat cushion, the three-dimensional network cushion element becomes low in resiliency due to a weight of seat occupant being repeatedly applied thereto and consequently loses in resilient recovery force for recovering its original shape, which causes a permanent downward settling of the three-dimensional network cushion element itself. As a result thereof, spaces among the entangled fibers in that network cushion element are extremely narrow to deteriorate the ventilation function thereof, and also, a shape of the seat cushion is deformed downwardly. Hence, there have been the following problems: quality degradation of outer appearance of the seat cushion; insufficient reduction of humidity that can not avoid sweaty state of seat occupant's thigh portions; degradation of stable support touch of the seat cushion to the seat occupant; and a short life of ventilation for the seat cushion.

It is a purpose of the present invention to provide a seat with ventilative property, which can avoid or minimize the possibility of its being permanently deformed and settled into an unrecoverable deformed state.

Means for Solving the Problem

In accordance with the present invention, there is provided a seat with ventilative property, which includes: a seat cushion having a ventilative property; and a main foam padding portion provided in the seat cushion, the main foam padding portion being formed of an urethane foam material,
the seat with ventilative property being characterized in that a three-dimensional network cushion element having an air-permeable, ventilative property is provided in the main foam padding portion in an integral manner, that the three-dimensional network cushion element comprises: a left three-dimensional network cushion element; and a right three-dimensional network cushion element, the left and right three-dimensional network cushion elements being respectively situated at left and right locations in a forwardly-facing region of the main foam padding portion, thereby being independent of each other therein, wherein the left location is a location on which substantially a left thigh portion of a seat occupant is to be contacted, whereas the right location is a location on which substantially a right thigh portion of the seat occupant is to be contacted, and that the right and left three-dimensional network cushion elements penetrate the main foam padding portion in a direction from an upper surface to a lower surface of that main foam padding portion.

According to the above-constructed seat with ventilative property, the aforesaid two three-dimensional network cushion elements are respectively disposed at two locations on which are contacted the left and right thigh portions of seat occupant, respectively, which means that the two three-dimensional network cushion elements are situated on the left- and right-side forward localized areas of the seat cushion, respectively, in a manner independent of each other. Such scattered arrangement of the three-dimensional network cushion elements is effective for avoiding wide occupation of one single three-dimensional network cushion element over the seating surface area of the seat cushion, thereby eliminating or minimizing the possibility of the seat cushion being downwardly deformed and permanently settled into an unrecoverable downwardly-deformed state. Hence, a short life of the seat due to the downward permanent settling can be substantially avoided. Also, this arrangement of the seat cushion is advantageous in that most of a load applied from a seat occupant will be exerted on a rearward area of the seat cushion at which a buttocks portion of a seat occupant is to be positioned, while on the other hand, in the forwardly-facing region of the seat cushion, such a load given from the seat occupant becomes progressively small as it proceeds to a front end of the seat cushion. Therefore, the possibility of downward permanent settling of the seat cushion is made further low.

Preferably, in the seat cushion, a base portion formed in shape of a plate may be provided so as to be integral with a lower end portion of each of the left and right three-dimensional network cushion elements. The base portion is to be a point for contact with a wall surface area of a die for forming the seat cushion, the wall surface area being so configurated to define a cavity of the die.

With this arrangement, during a foaming process, each of the two three-dimensional network cushion elements can hardly be dislocated from a preset position in the cavity at the steps where a liquid foaming agent is injected and swollen in the cavity. Thus, it is possible to insure that both two three-dimensional network cushion elements are integral with the main foam padding portion in a precise manner after completion of the foaming process.

Another aspect of the present invention is that an urethane foam impregnation layer may be defined in a surface of each of the left and right three-dimensional network cushion elements.

In this instance, the left and right three-dimensional network cushion elements may be reinforced by the urethane foam impregnation layer against deformation, whereby the possibility of downward permanent settling of both two three-dimensional network cushion elements can be made further low.

As a second embodiment of the present invention, there may be provided a seat with ventilative property, which includes: a seat back; and a main foam padding portion provided in the seat back, the main foam padding portion being formed of an urethane foam material, the seat with ventilative property being characterized in that a three-dimensional network cushion element having an air-permeable, ventilative property is provided in the main foam padding portion in an integral manner, that the three-dimensional network cushion element comprises: a left three-dimensional network cushion element; and a right three-dimensional network cushion element, the left and right three-dimensional network cushion elements being respectively disposed at left and right locations in an upper region of the main foam padding portion, wherein the upper region is a location on which substantially a back portion of a seat occupant is to be contacted, and that both right and left three-dimensional network cushion elements penetrate the main foam padding portion in a direction from a front surface to a rear surface of that main foam padding portion.

According to this second embodiment of seat with ventilative property, the left and right three-dimensional network cushion elements are provided in an upper region of the main foam padding portion in a manner independent of each other, such that those two three-dimensional network cushion elements are respectively disposed at two separate locations in the seat back on which a back portion of a seat occupant is to be contacted. Such scattered arrangement of the three-dimensional network cushion elements is quite effective for avoiding wide occupation of one single three-dimensional network cushion element over an entire surface area of the seat back, thereby eliminating or minimizing the possibility of the seat back becoming rearwardly deformed and settled into an unrecoverable rearwardly-deformed state. Therefore, a short life of the seat due to such rearward permanent settling can be substantially avoided.

Effects of the Invention

The present invention therefore can prevent the permanent settling and deformation in this kind of seat, while maintaining sufficient ventilation to reduce humidity therein so that a seat occupant may not become sweaty in the seat.

MODE FOR CARRYING OUT THE INVENTION

With reference to the annexed drawings, a detailed description will be made of a preferred embodiment of a seat with ventilative property, in accordance with the present invention.

Figure 1:
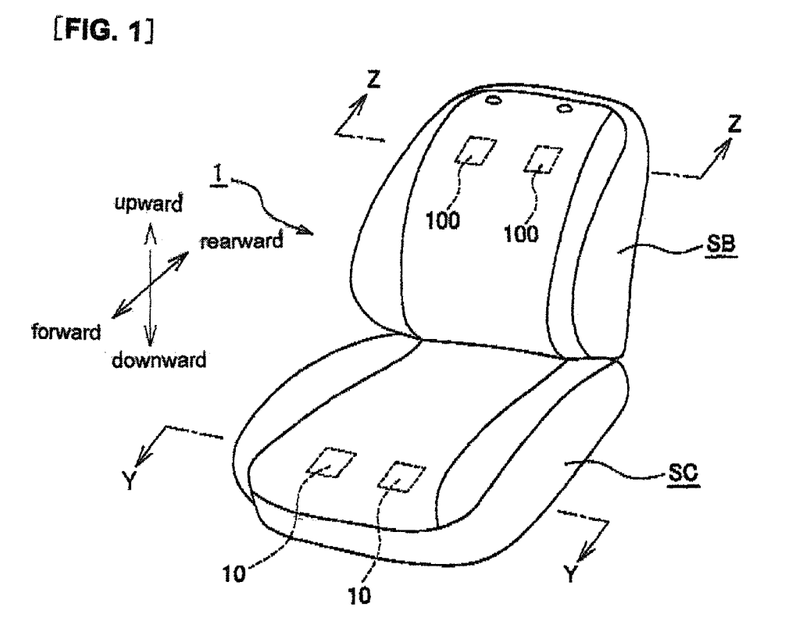
FIG. 1: A perspective view showing one exemplary embodiment of a seat with ventilative property in accordance with the present invention.

As shown in FIG. 1, a seat with ventilative property, designated by 1, is comprised of: a ventilative seat cushion SC; and a ventilative seat back SB inclinably connected to the seat cushion SC.

Figure 2:
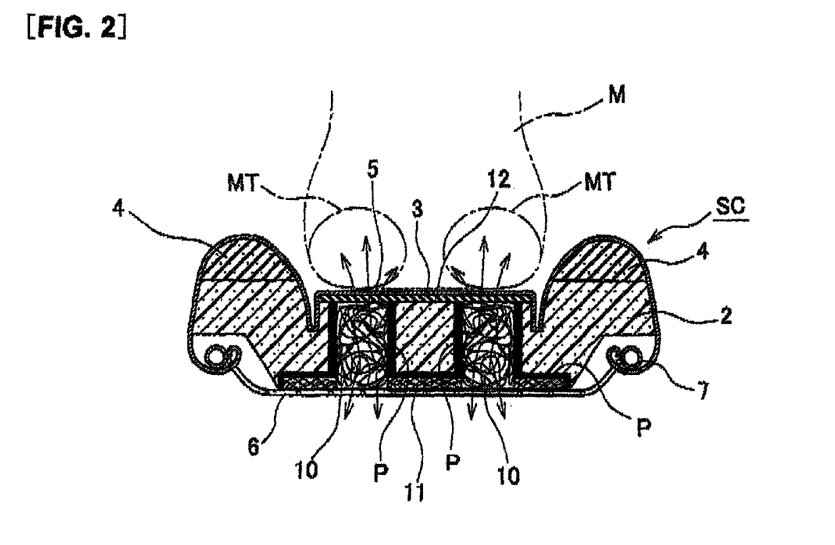
FIG. 2: A sectional view of a seat cushion of the seat, taken along the line Y-Y in the FIG. 2.
Figure 3:
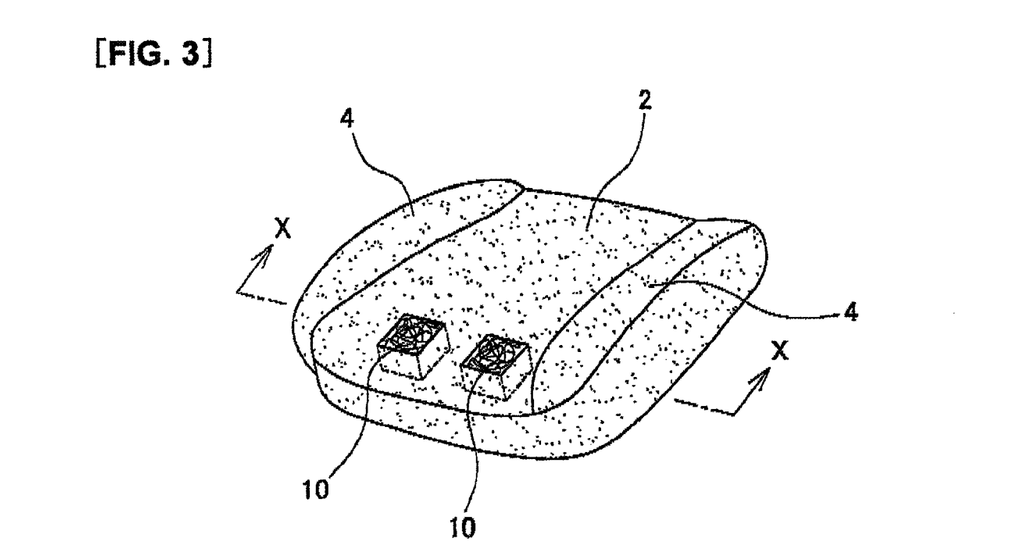
FIG. 3: A perspective view showing a whole foam padding provided in the seat cushion.

As shown in FIGS. 2 and 3, the seat cushion SC of the seat 1 includes: a main foam padding portion 2 made of an urethane foam material; and a pair of left and right side support padding portions 4 and 4. Those left and right side support padding portions 4 and 4 are provided to the main foam padding portion 2 in an integral manner and are located at left- and right-side areas of a seating surface 3 of the seat cushion, respectively, so as to protrude upwardly therefrom. Each of the two side support padding portions 4 is formed from a high-density urethane foam material which is large in density relative to the main foam padding portion 2.

The aforesaid main foam padding portion 2 and two side support padding portions 4 are both covered with a trim cover element 5 having a breathable property. As shown, the main foam padding portion 2 is, at its bottom surface, supported on a spring assembly 6 formed by a planar array of plural sinuous springs extending in one plane, and end portions of the spring assembly 6 are fixedly secured to a seat cushion frame 7.

A pair of first three-dimensional network cushion elements 10 and 10, each having an air-permeable, ventilative property, are integrally provided in the main foam padding portion 2 of the seat cushion SC, wherein such integral provision of both two first three-dimensional network cushion elements 10 in the main foam padding portion 2 is achieved by a required foaming process. The pair of first three-dimensional network cushion elements 10 and 10 are each formed by entangling a plurality of fibers with one another into the illustrated configuration wherein an air is allowed to flow through many spaces defined among the entangled fibers, as indicated by the arrows in FIG. 2, thereby permitting a high-efficient ventilation in the seat cushion. As viewed from FIG. 3, the two first three-dimensional network cushion elements 10 are located in the left- and right-side areas of a forwardly-facing region of the main foam padding portion 2, respectively, and thus disposed independently of each other therein. It is noted here that the said left-side area of the forwardly-facing region of the main foam padding portion 2 is defined at a point on which substantially a forward half of a left thigh portion MT of a seat occupant M is to be contacted, whereas on the other hand, the said right-side area of the forwardly-facing region of the main foam padding portion 2 is defined at a point on which substantially a forward half of a right thigh portion MT of the seat occupant M is to be contacted. Further, each first three-dimensional network cushion element 10 is shown as penetrating the main foam padding 2 vertically so as to extend from an upper surface 2a to a bottom surface 2b of that particular main foam padding 2. (See FIG. 4)

Preferably, the first three-dimensional network cushion element 10 may be formed by entangling a plurality of polypropylene fibers with one another, or may be formed by properly mixing and entangling a plurality of polypropylene fibers with a plurality of PET fibers in a required fashion. The illustrated first three-dimensional network cushion element is of a cubic shape, but may be formed in a columnar shape. In the seat cushion SC, there is provided a base portion 11 formed in the shape of a plate, such base portion 11 being so formed to surround and closely contact a lower end portion of each of the three-dimensional network cushion elements 10 and 10. Note that the base portion 11 is to be contacted on a wall surface 15a of a cavity S defined in a foaming die apparatus 14 during a foaming process (See FIG. 5). Formed in this base portion 11 are two rectangular opening regions 11a which are respectively situated at two locations corresponding to the two rectangular lower ends of the two three-dimensional network cushion elements 10, respectively, wherein each of the first three-dimensional network cushion elements 10 is formed in a rectangular parallelepiped shape. Namely, the rectangular opening region 11a of the base portion is identical in shape of cross-section to the rectangular lower end of each of the two first three-dimensional network cushion elements 10, and therefore, a predetermined area of all four lateral surfaces of that rectangular lower end portion is completely fitted in the corresponding rectangular opening region 11a (See FIG. 4).

The base portion 11 is formed of an unwoven fabric material and shown as being interposed between the spring assembly 6 and the bottom surface 2b of the main foam padding portion 2. Thus, the base portion 11 serves to receive the spring assembly 6 thereon to thereby prevent digging or depression of that spring assembly far into the main foam padding portion 2. As shown, an impregnation layer P is formed in the surfaces of each of the three-dimensional network cushion elements 10 as well as in the surfaces of the base portion 11, wherein the impregnation layer P has been created during a foaming process, in particular at the steps of injecting and curing a liquid foaming agent (e.g. a liquid urethane material of foaming popery) in the cavity S defined in the foaming die apparatus 14.

Interposed between the trim cover element 5 and the upper surface 2a of the main foam padding portion 2 is a thin elastic element 12 formed of a slab urethane material having a breathable property. This thin elastic element 12 lies over an entire area of the seating surface 3, thus uniformly overlaying the soft main foam padding portion 2 as well as the relatively-hard first three-dimensional network cushion elements 10. Therefore, two different degrees of hardness, caused by such soft padding portion 2 and relatively-hard cushion elements 10, can be substantially counterbalanced with each other and absorbed by the thin elastic element 2, whereby it is possible to avoid or alleviate any objectionable touch that may discomfort a seat occupant due to such two different degrees of hardness.

Figure 4:
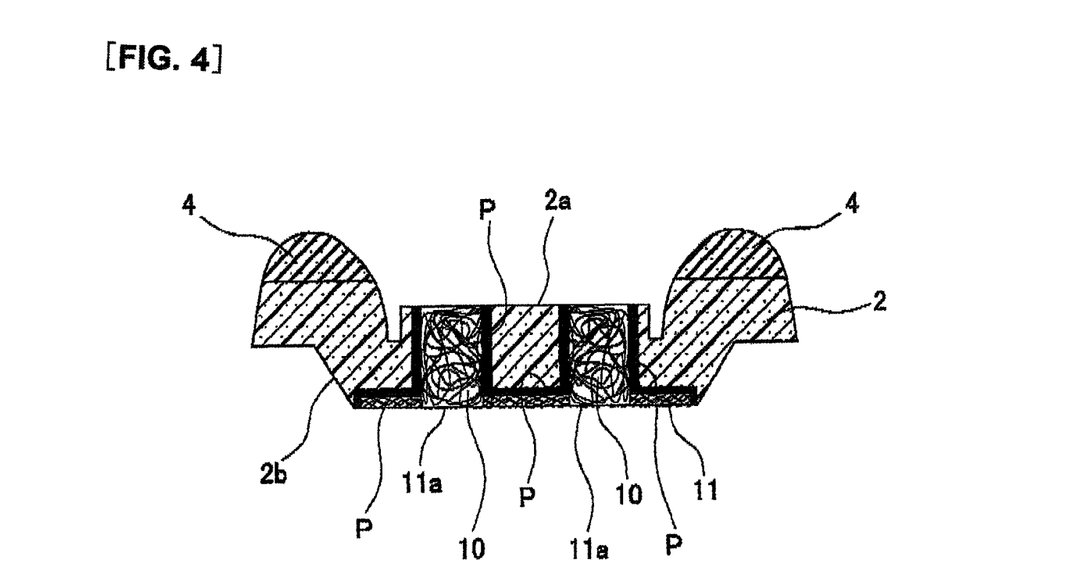
FIG. 4: A sectional view taken along the line X-X in the FIG. 3.

As seen in FIGS. 3 and 4, the two first three-dimensional network cushion elements 10 are respectively disposed at two locations on which are contacted the left and right thigh portions of a seat occupant, respectively, which means that the two three-dimensional network cushion elements 10 are situated on the left- and right-side forward localized areas of the seat cushion, respectively, in a manner independent of each other. Such scattered arrangement of the first three-dimensional network cushion elements 10 is quite effective for: avoiding wide occupation of one single three-dimensional network cushion element over the seating surface area of the seat cushion; and preventing intensive exertion of one single great load upon the three-dimensional network cushion elements 10, wherein the said one single great load is applied thereto from an entirety of both two thigh portions MT and MT of the seat occupant M, so that most of the load applied to the three-dimensional network cushion elements 10 may be imparted and distributed into the main foam padding portion 2 that surrounds the network cushion elements 10. This arrangement can effectively reduce the possibility of permanent downward settling of the first three-dimensional network cushion elements 10, notwithstanding a long-time use of the seat cushion. Hence, the many spaces among the fibers in the three-dimensional network cushion element 10 can be maintained without any substantive deformation thereof, which is sufficient to assure a stable ventilation of the seat cushion. Because the permanent downward settling of the three-dimensional network cushion element can apparently be reduced as stated above, it is to be appreciated that, in most cases, an entirety of the seat cushion SC is not subjected to any appreciable permanent downward settling and deformation, irrespective of its being used for a long period of time, so that the outer appearance and ventilation of the seat cushion can be maintained in a good condition for long. Accordingly, the above-described improvements of the seat cushion effectively render the ventilative seat 1 robust enough to withstand a long-time use thereof and have a long life as compared with the previously-stated conventional seats with hitherto ventilation arrangements.

In addition, as understandable from FIG. 4, the urethane foam impregnation layer P is defined in entire four lateral surfaces of each of the two first three-dimensional network cushion elements 10 and 10. This urethane foam impregnation layer P has been created during a foaming process for forming the seat cushion, at which process, the four lateral surfaces of each three-dimensional network cushion element 10 have been impregnated with a liquid foaming agent (a liquid urethane material of forming property) and the liquid foaming agent has been hardened therein, whereupon the urethane foam impregnation layer P is defined in all the four lateral surfaces of the network cushion element 10. Owing to such impregnation and hardening, the urethane foam impregnation layer P per se is great in hardness relative to both main foam padding portion 2 and first three-dimensional network cushion elements 10. In other words, there is quite a hard layer P defined in all the four lateral surfaces of each first three-dimensional network cushion element 10, and such hard layer penetrates the seat cushion SC vertically. With this construction, most of downward load applied from the two thigh portions MT and MT of the seat occupant M to the seat cushion SC is directly received by that hard impregnation layer P, which can preclude or greatly decrease the exertion of the downward load on the three-dimensional network cushion element 10. It is therefore possible to almost completely prevent deformation of the network cushion element 10, thereby insuring great reduction of the downward permanent settling thereof. Moreover, the base portion 11 is also of a network structure, and the upper surface of that base portion 11 is provided with an urethane foam impregnation layer P, because, during the above-stated foaming process, the upper surface of the base portion 11 has also been impregnated with the liquid foaming agent (liquid urethane material of forming property) and then the liquid foaming agent has been hardened therein, whereupon the urethane foam impregnation layer P is defined in the upper surface region of the base portion 11 as well. Due to such hard urethane foam impregnation layer P, a whole of the base portion 11 formed as a plate is so much reinforced as to normally retain its original shape and have a resilient recovery of its original shape against a load applied thereto. Thus, even when a downward load given from the seat occupant M is imparted to the base portion 11 via the main foam padding portion 2, the base portion 11 itself is not subjected to undesired large downward deformation and bending, and further, an entirety of that base portion 11 is evenly supported on the spring assembly 6 for additional increased reinforcement thereof. Accordingly, a stable, comfortable support touch of the seat cushion can be enjoyed by the seat occupant.

Figure 5:
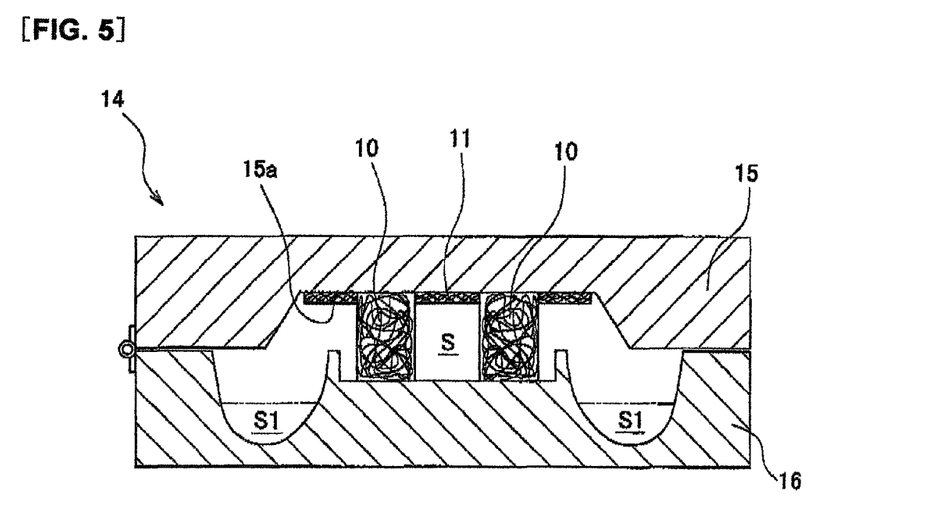
FIG. 5: A sectional view in which a die apparatus employed is indicated.

Now, a description will be made of a foaming process with particular regard to the above-described main foam padding portion 2. FIG. 5 shows the foaming die apparatus comprising an upper die 15 and a lower die 16, which are hingedly interconnected for allowing them to move away from each other to open the die apparatus, and a cavity S may be defined between the upper and lower dies 15 and 16 when they are mated with each other. With this die arrangement, the three-dimensional network cushion element 10, which is secured to the base portion 11 integrally, is first placed in a part of the cavity S at the lower die, with the base portion 11 being situated atop the three-dimensional network cushion element, and thereafter, the upper and lower dies are mated with each other, such that the base portion 11 contacts a surface 15a of the upper die 15 within the cavity S.

Figure 6:
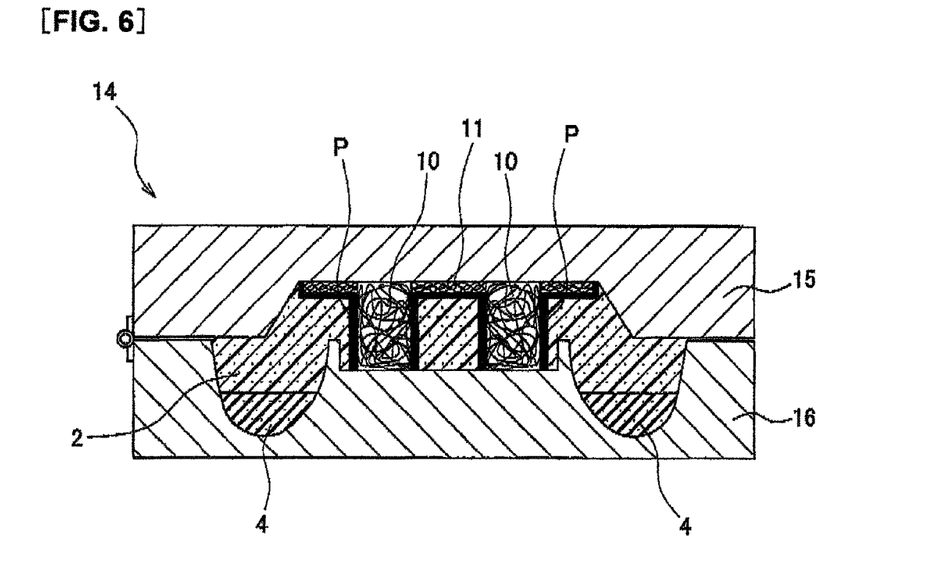
FIG. 6: A sectional view of the die apparatus which shows a state where a liquid urethane foaming agent has been injected and cured in a cavity defined in the die apparatus.

After the upper and lower dies have been mated with each other as stated above into the shown closed state of the die apparatus, a first liquid foaming agent, having a low blowing and foaming degree to create a high-density foam, is injected into each of two cavity areas S1 of the cavity S, wherein, in the lower die, such two cavity areas S1 are respectively defined at two different zones in which two side support padding portions 4 are to be formed, respectively. Subsequent thereto, a second liquid foaming agent is injected into the cavity S, wherein the second liquid foaming agent is great in blowing and foaming degree relative to the aforesaid first liquid foaming agent.

At this point of time, an urethane foam impregnation layer P begins to be formed in the four lateral surfaces of each of the two three-dimensional network cushion elements 10 as well as in the upper surface of the base portion 11. During the foaming process, each three-dimensional network cushion elements 10, because of its firm connection with the base portion 11 retained in the upper die, can hardly be dislocated from a preset position in the cavity S at the steps where the first liquid foaming agent is injected and swollen in the cavity S. Thus, during the foaming process, the three-dimensional network cushion elements are positively retained against dislocation, and in a resulting seat cushion produced after the foaming process, the three-dimensional network cushion elements as well as the base portion are in a precise integral relation with the main foam padding portion.

Figure 7:
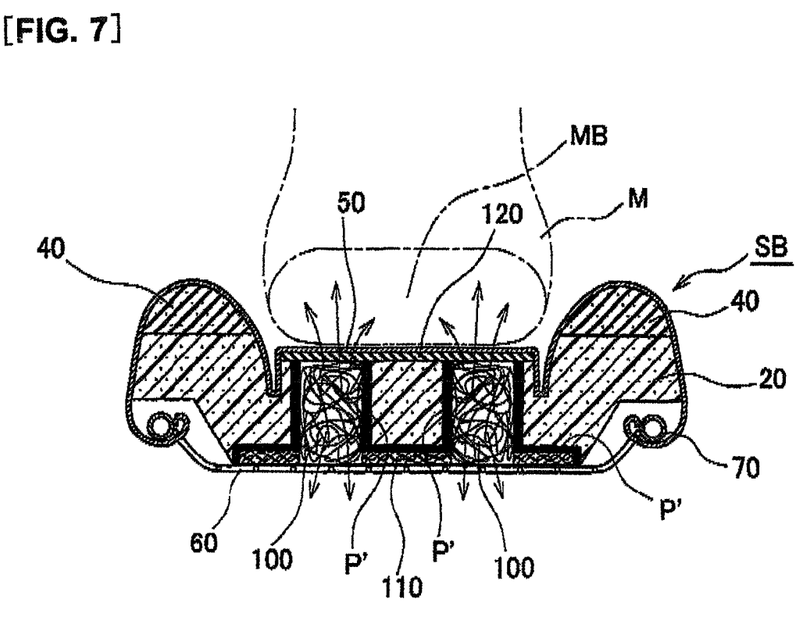
FIG. 7: A sectional view taken along the line Z-Z in the FIG. 1.

FIGS. 1 and 7 indicate a second embodiment of the present invention. According to the second embodiment, a pair of second three-dimensional network cushion elements 100 and 100 may be provided in the ventilative seat back SB so as to be integral with a main foam padding portion 20 formed in the seat back SB. It is noted that a structure of each of the second three-dimensional network cushion elements 100 and 100 is substantially identical to the above-described structure of each of the foregoing first three-dimensional network cushion elements 10 and 10, and further, all the steps for constructing those second three-dimensional network cushion elements 100 and pertinent foam padding portions are substantially the same with all the above-described steps for constructing the first three-dimensional network cushion elements 10 and pertinent foam padding portions. Therefore, any further detailed description in this regard is omitted for the sake of simplicity. Also, the seat back SB itself is basically identical to the seat cushion SC in terms of structure and constituent parts used as well as in terms of assembly steps involved, for which reason, any further detailed description about the seat back is omitted for the sake of simplicity.

Hereinafter, this second embodiment of the present invention will be described, with reference to FIG. 7.

In FIG. 7, designation 20 denotes a main foam padding portion, and designations 40 denote two side support padding portions, respectively, all of which constitute a part of the seat back SB. Those main foam and side support padding portions 20 and 40 are both covered with a trim cover element 50 having a breathable property. As shown, the main foam padding portion 20 is, at its bottom surface, supported on a spring assembly 60 formed by a planar array of plural sinuous springs extending in one plane, and end portions of the spring assembly 60 are fixedly secured to a seat back frame 70.

The pair of second three-dimensional network cushion elements 100 and 100 are shown to be located in the left- and right-side areas of an upper region of the main foam padding portion 20, respectively, and thus disposed independently of each other. The upper region of the main foam padding portion 20 is a point upon which an upper back portion MB of a seat occupant M is to be contacted. Further, each second three-dimensional network cushion element 100 is shown as penetrating the main foam padding portion 20 horizontally so as to extend from a front surface 20a to a rear surface 20b of that main foam padding portion 20.

Both two rear end portions of the two second three-dimensional network cushion elements 100 are connected with a base portion 110 in an integral manner, wherein the base portion is formed of an unwoven fabric material. This base portion 110 has, formed therein, a pair of rectangular opening regions 110a which are respectively situated at two locations corresponding to the two rectangular rear ends of the two second three-dimensional network cushion elements 100, respectively, wherein each of the second network cushion elements 100 is formed in a rectangular parallelepiped shape. Namely, the rectangular opening region 110a of the base portion is identical in shape of cross-section to the rectangular rear end of each of the two second three-dimensional network cushion elements 100, and therefore, a predetermined area of all four lateral surfaces of that rectangular rear end portion of the second three-dimensional network cushion element is completely fitted in the corresponding rectangular opening region 110a. Note that the base portion 110 is interposed between the spring assembly 60 and the bottom surface 20b of the main foam padding portion 20.

Designation 120 denotes a thin elastic element having a breathable property, which is interposed between the front surface 20a of the main foam padding portion 20 and the trim cover element 50.

According to the present second embodiment, the two second three-dimensional network cushion elements 100 and 100 are provided in the upper region of the main foam padding portion 20 in a manner independent of each other, such that the two second three-dimensional network cushion elements 100 are respectively disposed at two different locations on which left and right local regions of the back portion MB of the seat occupant M are to be contacted, respectively. Such scattered arrangement of the second three-dimensional network cushion elements 10 is quite effective for: avoiding wide occupation of one single three-dimensional network cushion element over an entire surface area of the seat back; and preventing intensive exertion of one single great rearward load upon the second three-dimensional network cushion elements 100, wherein the said one single great rearward load is applied thereto from an entirety of the back portion MB of the seat occupant M, so that most of the great rearward load applied to the second three-dimensional network cushion elements 100 may be imparted and distributed into the main foam padding portion 20 that surrounds those second three-dimensional network cushion elements 100. This arrangement can effectively reduce the possibility of permanent rearward settling of the second three-dimensional network cushion elements 100, notwithstanding a long-time use of the seat. Hence, the many spaces among the fibers in the second three-dimensional network cushion element 100 can be maintained without any substantive deformation thereof, which is sufficient to assure a stable ventilation of the seat back.

As stated above, the permanent rearward settling of the second three-dimensional network cushion element 100 can be reduced, and therefore in most cases, an entirety of the seat back SB may not be subjected to any appreciable rearward permanent settling and deformation, irrespective of its being used for a long period of time, so that the outer appearance and ventilation function of the seat back can be maintained in a good condition for long. Accordingly, the above-described improvements of the seat back effectively render the ventilative seat 1 robust enough to withstand a long-time use thereof and have a long life as compared with the conventional seats with hitherto ventilation arrangements.

In addition, an urethane foam impregnation layer P' is defined in entire four lateral surfaces of each of the two second three-dimensional network cushion elements 100. This urethane foam impregnation layer P' has been created during a foaming process for forming the headrest, at which process, the four lateral surfaces of each three-dimensional network cushion element 100 have been impregnated with a liquid foaming agent (a liquid urethane material of forming property) and the liquid foaming agent has been hardened therein, whereupon the urethane foam impregnation layer P' is defined in all the four lateral surfaces of the network cushion element 100. Owing to such impregnation and hardening, the urethane foam impregnation layer P' per se is great in hardness relative to both main foam padding portion 2 and second three-dimensional network cushion elements 100. In other words, there is quite a hard layer P' defined in all the four lateral surfaces of each second three-dimensional network cushion elements 100, and such hard layer penetrates the seat back SB horizontally in forward and rearward directions of the seat. With this construction, most of rearward load applied from the back portion MB of the seat occupant M to the seat back SB is directly received by that hard impregnation layer P', which can preclude or greatly decrease the exertion of the rearward load on the three-dimensional network cushion element 100. It is therefore possible to almost completely prevent deformation of the second network cushion element 100, thereby insuring great reduction of the permanent rearward settling thereof.

Moreover, as shown in FIG. 7, the base portion 110 is also of a network structure, and the upper surface of this base portion 110 is provided with an urethane foam impregnation layer P', because, during the above-stated foaming process, the upper surface of the base portion 110 has also been impregnated with the liquid foaming agent (liquid urethane material of forming property) and then the liquid foaming agent has been hardened therein, whereupon the urethane foam impregnation layer P' is defined in the upper surface region of the base portion 110 as well. Due to such hard nature of the urethane foam impregnation layer P', a whole of the base portion 110 formed as a plate is so much reinforced as to normally retain its original shape and have a resilient recovery of its original shape against a load applied thereto. Thus, even when a rearward load given from the back portion MB of the seat occupant M is imparted to the base portion 110 via the main foam padding portion 20, the base portion 110 itself is not subjected to undesired large rearward deformation and bending, and further, an entirety of that base portion 110 is evenly supported on the spring assembly 60 for additional increased reinforcement thereof. Accordingly, a stable, comfortable back support touch of the seat back can be enjoyed by the seat occupant.

It should be understood that the present invention is not particularly limited to the above-described embodiments, but any modification and replacement may be applied thereto, without departing from the scopes of the appended claims.

DESCRIPTION OF THE REFERENCE NUMERALS

1 . . . a seat with ventilative property
2 . . . a main foam padding portion of a seat cushion
3 . . . a seating surface of the seat cushion
4 . . . a side support padding portion of the seat cushion
5 . . . a trim cover element of the seat cushion
6 . . . a spring assembly
7 . . . a seat cushion frame
10 . . . a first three-dimensional network cushion element
11 . . . a base portion
12 . . . a thin elastic element
14 . . . a foaming die apparatus
15 . . . an upper die
15a . . . a wall surface of the upper die
16 . . . a lower die
20 . . . a main foam padding portion of a seat back
40 . . . a side support padding portion of the seat back
50 . . . a trim cover element of the seat back
60 . . . a spring assembly
70 . . . a seat back frame
100 . . . a second three-dimensional network cushion element
110 . . . a base portion
120 . . . a thin elastic element
P . . . an urethane foam impregnation layer in the seat cushion
P' . . . an urethane foam impregnation layer in the seat back
S . . . a cavity
SB . . . a seat back
SC . . . a seat cushion

The invention claimed is:
1. A seat with ventilative property comprising:
a seat cushion having a ventilative property;
a main foam padding portion provided in said seat cushion, said main foam padding portion being formed of an urethane foam material, a three-dimensional network cushion element having an air-permeable, ventilative property that is provided in said main foam padding portion in an integral manner, said three-dimensional network cushion element including: a left three-dimensional network cushion element; and a right three-dimensional network cushion element, said left and right three-dimensional network cushion elements being respectively situated at left and right locations in a forwardly-facing region of the main foam padding portion, thereby being independent of each other therein, wherein said left location is a location on which substantially a left thigh portion of a seat occupant is to be contacted, whereas said right location is a location on which substantially a right thigh portion of said seat occupant is to be contacted, and that both said right and left three-dimensional network cushion elements penetrate said main foam padding portion in a direction from an upper surface to a lower surface of said main foam padding portion; and a urethane foam impregnation layer that is disposed on one or more lateral surfaces of each of said left and right three-dimensional network cushion elements.

2. The seat with ventilative property as described in claim 1, further comprising: a base portion formed in a shape of a plate is provided so as to be integral with a lower end portion of each of said left and right three-dimensional network cushion elements, and that said base portion is to be a point for contact with a wall surface area of a die for forming said seat cushion, said wall surface area being so configurated to define a cavity of said die.

3. A seat with ventilative property comprises:

a seat back;

a main foam padding portion provided in said seat back, said main foam padding portion being formed of an urethane foam material, a three-dimensional network cushion element having an air-permeable, ventilative property that is provided in said main foam padding portion in an integral manner, said three-dimensional network cushion element including: a left three-dimensional network cushion element; and a right three-dimensional network cushion element, said left and right three-dimensional network cushion elements being respectively disposed at left and right locations in an upper region of the main foam padding portion, wherein said upper region is a location on which substantially a back portion of a seat occupant is to be contacted, and that both said right and left three-dimensional network cushion elements penetrate said main foam padding portion in a direction from a front surface to a rear surface of said main foam padding portion; and a urethane foam impregnation layer that is disposed on one or more lateral surfaces of each of said left and right three-dimensional network cushion elements.

\* \* \* \* \*